Figure 1:
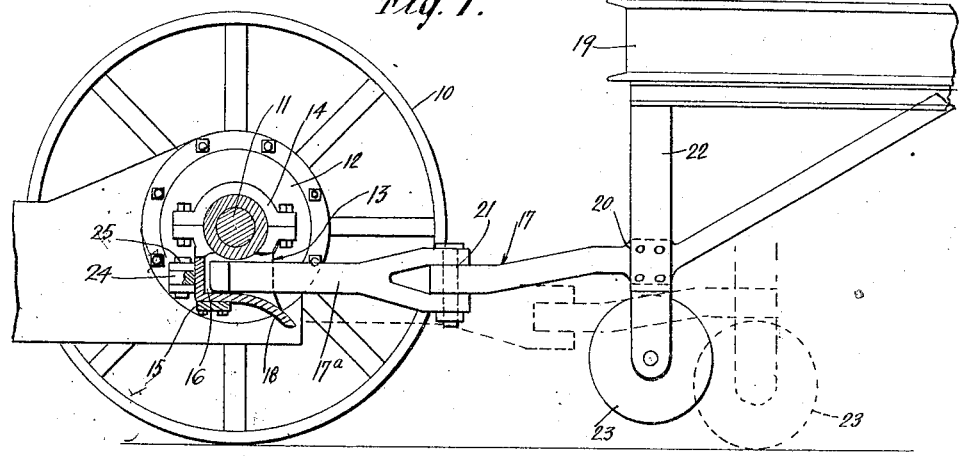

Jan. 27, 1925.

H. C. BENNETT ET AL 1,524,504

TRAILER COUPLING

Filed June 4, 1923

Inventors.
Harold. C. Bennett.
Garner. L. Knox.
by
Attorney.

Patented Jan. 27, 1925.

1,524,504

UNITED STATES PATENT OFFICE.

HAROLD C. BENNETT AND GARNER L. KNOX, OF LOS ANGELES, CALIFORNIA.

TRAILER COUPLING.

Application filed June 4, 1923. Serial No. 643,230.

*To all whom it may concern:*

Be it known that we, HAROLD C. BENNETT and GARNER L. KNOX, citizens of the United States, residing in Los Angeles, in the county of Los Angeles, State of California, have jointly invented certain new and useful Improvements in Trailer Couplings, of which the following is a specification.

This invention relates to trailer couplings and more particularly to couplings adapted to two wheel trailers, the forward ends of which are supported by towing vehicles. When uncoupled, the weight of the forward end of such a trailer is ordinarily supported by skids or small wheels, and when coupled to a towing vehicle it is necessary that the forward end of the trailer be elevated sufficiently to clear the skids or supporting wheels from the ground. Therefore, it is an object in this invention to provide for the automatic elevation of the forward end of the trailer as it enters into coupled engagement with the towing vehicle. It is found desirable to mount trailer coupling devices at a point or points where the strains are most directly transmitted to the rear supporting wheels of the towing vehicle structure and where the towing and weight imposed forces tend to keep the towing vehicle on the ground rather than raise the forward end. Our device is therefore arranged for attachment to and below the rear axle housing or associated parts of the towing vehicle. Furthermore, certain types of vehicles used for towing are so constructed that their bodies and frames are not adaptable for the convenient attachment of coupling devices, and therefore our device is constructed in such a manner that it may be attached irrespective of the frame and body construction of the towing vehicle.

In our joint co-pending application filed under even date herewith, and in a co-pending application filed Apr. 9, 1923, Ser. No. 630,752 by Garner L. Knox, trailer couplings are disclosed which incorporate the above named features of automatic trailer elevation and of being adaptable for connection to and below the axle housing or differential housing of the towing vehicle, and both of said applications illustrate the coupling as including a draft bar and a separate organization of elements for supporting the weight of the forward end of the trailer. The present disclosure differs in one respect by the utilization of connecting members functioning both as draft and weight supporting means. Other features of novelty in arrangement, structure, and operation are pointed out in the appended claims and will be better understood from the following detailed description of a specific illustrative form and arrangement, reference being had to the accompanying drawings in which—

Figure 2:
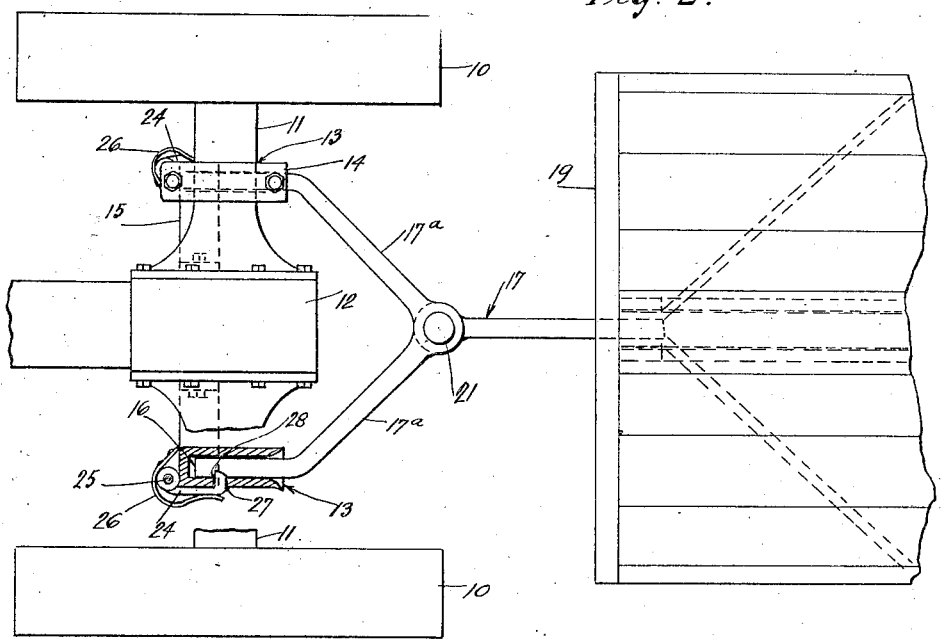

Fig. 1 is a longitudinal elevation, with parts in section, showing a coupled towing vehicle and trailer, and we have also indicated in the figure the position of the coupling elements carried by the trailer prior to their engagement with the towing vehicle; and Fig. 2 is a plan view of Fig. 1 showing a portion of the axle housing broken away to expose certain elements of the coupling device.

We have shown at 10 the rear wheels of a towing vehicle and at 11 the rear axle housing with the differential casing 12 located centrally thereof. We have mounted two supporting members 13 on the axle housing 11 by means of clamps 14 and have disposed these members on the opposite sides of differential casing 12. Cross bar 15 may extend between and be secured to members 13 to prevent relative movement therebetween and to generally stiffen the structure, and, if desired, bar 15 may also be anchored to the casing 12 or to housing 11. Provided in members 13 are the draw bar receiving sockets 16, the mouths of which are rearwardly disposed and may be flared, as illustrated in Fig. 2 to more readily admit and to guide the free ends of draw bar 17 into inserted engagement therewith. The lower socket defining wall 18 is inclined downwardly and rearwardly to form a draw bar elevating apron or plane.

Bar 17 is attached to trailer 19 at 20, and may be hinged at 21 to allow pivotal movement when the direction of the towing vehicle is changed and to obviate the necessity of the towing vehicle and trailer being in exact longitudinal alignment while they are being coupled. The free end of bar 17 is forked to form arms $17^a$, the extremities of which are adapted to be received in the sockets 16.

The front end of trailer 19, when uncoupled, is supported by a depending support such as 22 which usually includes a ground bearing wheel 23, the arms $17^a$ then being below the socket 16 but in line with the inclined plane or apron 18. When it is desired to effect a coupling, the towing vehicle is backed into the trailer, whereupon the sliding engagement between apron 18 and the ends of arm 17ª elevates draw bar 17 and the forward end of the trailer, thus clearing wheels 23 from the ground and seating the ends of the arms within sockets 16. It is evident that the weight of the forward end of the trailer is now imposed upon the axle housing 11 through support members 13.

We may employ various means for accomplishing the draft connection between members 13 and tongue 17, and we have illustrated a typical arrangement. Latches or bolts 24 are pivotally mounted on members 13 at 25, and springs 26 serve to urge the ends of the latches through suitable openings 27 in the sides of members 13 and partially into sockets 16. As arms 17ª enter socket 16, they thrust latches 24 out of their path until notches 28 in the arms come into registry with opening 27, whereupon springs 26 urge the latches into locking engagement with the arm to prevent subsequent undesired withdrawal or separative movement between the towing vehicle and the trailer. There is sufficient clearance between the upper wall of socket 16 and arms 17ª to allow desirable freedom of movement between members 13 and 17 when road depressions or hummocks are encountered by the vehicles. It will be seen that in this structure we have defined a draft and weight connection that puts both the weight and draft forces below the rear axle of the towing vehicle. In this form of our invention this is done through the medium of a single connecting means—the parts 17ª. In the co-pending application referred to this same thing is done through the medium of two separate means. But all forms put the weight and draft stresses directly on the towing vehicle axle and provide for automatic raising of the forward end of the trailer.

We have illustrated and described a specific embodiment of our invention but various changes in structure and arrangement may be made without departing from the spirit and scope of our invention and therefore we do not wish to be limited to our showing except for such limitations as a fair interpretation of the appended claims may import.

We claim:

1. A coupling device adapted to couple a towing vehicle to a trailer, embodying a bifurcated draw bar on the trailer, a pair of supporting members affixed to the vehicle structure, the bifurcations of the draw bar being adapted to rest on the supporting members, the supporting members having inclined surfaces adapted to be disposed in the path of the draw bar to elevate it during uniting movement between the towing vehicle and the trailer, draft connection means associated with each supporting member and adapted to engage the draw bar bifurcations, and the draw bar having a pivot around which it swings horizontally.

2. A coupling device adapted to couple a towing vehicle to a trailer, embodying a horizontally hinged bifurcated draw bar on the trailer, a pair of supporting members affixed to the axle housing of the towing vehicle near the rear wheels, the bifurcations of the draw bar being adapted to rest on the supporting members, and the supporting members having inclined surfaces adapted to be disposed in the path of the draw bar to elevate it during uniting movement between the towing vehicle and the trailer.

3. A coupling device adapted to couple a towing vehicle to a trailer, embodying a bifurcated draw bar on the trailer, a pair of supporting members affixed to the axle housing of the towing vehicle near the rear wheels and provided with bar receiving sockets, the bottom walls of the sockets including inclined surfaces disposed in the path of the bifurcations and adapted to guide them into the sockets and to elevate the draw bar during uniting longitudinal movement between the towing vehicle and the trailer.

4. A coupling device adapted to couple a towing vehicle to a trailer, embodying a bifurcated draft-connection and weight-supporting member on the trailer, and a pair of supporting and connecting members mounted on and below the towing vehicle axle near the rear wheels and adapted to take the bifurcations of the trailer member.

5. A coupling device adapted to couple a towing vehicle to a trailer, embodying a bifurcated draft-connection and weight supporting member on the trailer, and a pair of supporting and connecting members mounted on and below the towing vehicle axle near the rear wheels and adapted to take the bifurcations of the trailer member, the said trailer member having a horizontal hinge back of its bifurcations.

In witness that we claim the foregoing we have hereunto subscribed our names this 21st day of May, 1923.

HAROLD C. BENNETT.
GARNER L. KNOX.